(12) United States Patent
Rossner et al.

(10) Patent No.: US 8,030,990 B2
(45) Date of Patent: Oct. 4, 2011

(54) MEASURING INSTRUMENT IN TWO-CONDUCTOR TECHNOLOGY

(75) Inventors: Ewald Rossner, Obernburg (DE); Wolfgang Lorzel, Aschaffenburg (DE); Thomas Rothenbach, Burgstadt (DE); Arno Klug, Elsenfeld (DE); Mirko Di Marco, Klein-Wallstadt (DE); Roland Hofmann, Mombris (DE); Josef Kunz, Kirchzell (DE)

(73) Assignee: Wika Alexander Wiegand GmbH & Co. KG, Klingenberg (DE)

( * ) Notice: Subject to any disclaimer, the term of this patent is extended or adjusted under 35 U.S.C. 154(b) by 0 days.

(21) Appl. No.: 12/298,284

(22) PCT Filed: Apr. 23, 2007

(86) PCT No.: PCT/EP2007/053947
§ 371 (c)(1),
(2), (4) Date: Oct. 20, 2009

(87) PCT Pub. No.: WO2007/122214
PCT Pub. Date: Nov. 1, 2007

(65) Prior Publication Data
US 2010/0045366 A1   Feb. 25, 2010

(30) Foreign Application Priority Data
Apr. 24, 2006 (EP) .................................. 06113003

(51) Int. Cl.
G05F 1/10 (2006.01)
(52) U.S. Cl. ........................................ 327/544; 327/516
(58) Field of Classification Search .................. 327/509, 327/510, 511, 512, 516, 530, 534, 544
See application file for complete search history.

(56) References Cited

U.S. PATENT DOCUMENTS

| 5,563,587 | A | 10/1996 | Harjani | |
|---|---|---|---|---|
| 7,415,366 | B2 * | 8/2008 | Florenz et al. | 702/57 |
| 7,573,391 | B2 * | 8/2009 | Adam | 340/584 |

FOREIGN PATENT DOCUMENTS

| CN | 1290852 A | 4/2001 |
|---|---|---|
| DE | 100 40 356 A1 | 2/2002 |

OTHER PUBLICATIONS

Boom Van Den T: "Integrierter Drucksensor Wird Drahtlos Versorgt" Elektronik, Weka Fachzeitschriftenverlag, Poing, De, vol. 49, No. 7, Apr. 4, 2000, p. 54, XP000959790 ISSN: 0013-5658 abstract;figure 1.

* cited by examiner

*Primary Examiner* — Jeffrey Zweizig
(74) *Attorney, Agent, or Firm* — Baker & Hostetler LLP

(57) ABSTRACT

In a two-conductor technology circuit the use of certain ASIC components is made possible which, for instance, allow for the supply of contact-free rotational angle sensors, although said ASIC components have a high current consumption.

23 Claims, 3 Drawing Sheets

MEASURING INSTRUMENT IN TWO-CONDUCTOR TECHNOLOGY

CROSS-REFERENCE TO RELATED APPLICATIONS

This application is a continuation of PCT/EP2007/053947 filed on Apr. 23, 2007 which claims priority to EP 06113003.5 filed on Apr. 24, 2006, the disclosures of each are incorporated herein by reference.

FIELD OF THE INVENTION

The invention relates to a current-limited circuit for a measuring instrument in two-conductor technology, a measuring instrument utilizing said circuit and a method for current-limited measuring signal output for use in the two-conductor technology.

STATE OF THE ART

In the field of temperature and pressure measuring technology the use of analogue measuring devices is common.

When said analogue measuring devices are to be included in a process control, it is necessary to provide electric signals which reproduce the analogue display. This means that the analogue display of the measured variable has to be converted into electric signals.

In the field of process industry such as in chemistry a two-conductor current signal of the measuring instruments is required according to today's standard. This follows from a definition of requirements to devices and methods as defined by the Standardization Association for Measurement and Control in Chemical Industry (NAMUR). NAMUR is an application association for process measuring and control engineering. Electrical units such as process measuring and control systems (PLS) or stored-program controls (SPS) and the programs stored there are understood by process measuring and control engineering.

More exactly, NAMUR determined a current range of from 4 to 20 milliamps for providing said electrical units with the two-conductor current signal.

For converting the analogue displays of the measuring instruments into electric signals certain restrictions are resulting, however, because the circuit for detecting the measuring display must observe the above-indicated current range at least at the output side, for instance according to several regulations for detection only less than 4 milliamps are allowed to be used. The supply power is restricted by the usual supply voltage.

In the state of the art these requirements were taken into account by using linear amplifiers, for instance, which do not consume that much current, but the use of application-specific integrated circuits (ASIC, as they are called) has not been possible so far due to the high current consumption thereof.

SUMMARY OF THE INVENTION

Accordingly, the object underlying the present invention is to eliminate the afore-mentioned drawbacks from the state of the art.

More exactly speaking, in accordance with certain embodiments of the present invention in a circuit in two-conductor technology according to NAMUR the use of certain ASIC components is made possible which, for instance, allow for the supply of contact-free rotational angle sensors, although said ASIC components have a high current consumption.

The solution according to a first aspect of the present invention is a circuit for a measuring instrument comprising: a logic circuit having a digital memory configured to input and output measuring signals; a controllable current sink which is configured for the operation of a current loop having a limited current range, the controllable current sink being configured to convert information supplied by the logic circuit into an output current on the current loop; an application-specific integrated circuit configured to detect a measurement-specific movement which is connected to the logic circuit for outputting measuring signals corresponding to measured values of movement; and an energy storage device connected to the controllable current sink for energy input and connected to the application-specific integrated circuit for energy output; wherein the logic circuit controls the state of connection of the energy storage device so that the energy storage device is connected to the application-specific integrated circuit each time it has reached an amount of energy missing in the energy supply of the latter.

A preferred embodiment of this aspect is a circuit for a measuring instrument comprising: a microprocessor configured to input measuring signals; a voltage/current converter circuit configured to operate a current loop having a limited current range, wherein the voltage/current converter circuit is configured to convert an input voltage supplied by the microprocessor into an output current on the current loop; an application-specific integrated circuit configured to detect an angle of rotation which is connected to the microprocessor for outputting measuring signals corresponding to measured values of the angle of rotation; and a capacitor which is either connected to the voltage/current converter circuit for charging with a supply voltage or is connected to the application-specific integrated circuit for supplying charge; wherein the microprocessor controls the state of connection of the capacitor so that the capacitor is connected to the application-specific integrated circuit whenever it carries a charge sufficient for the energy supply of the latter.

The circuit can be especially adjusted that the current flowing to the application-specific circuit for detecting the angle of rotation when the capacitor is discharged is above the limited current range.

With respect to the requirements according to NAMUR for the chemical process industry for providing a two-conductor current signal, the limited current range preferably corresponds to 4 to 20 milliamps.

Moreover, the microprocessor is preferably adjusted so that it holds the input voltage supplied to the voltage/current converter circuit, until a new measuring signal is supplied to the microprocessor by the application-specific circuit.

Furthermore, the microprocessor can be adjusted such that it controls the state of connection of the capacitor by either measuring the charge of the capacitor and/or the capacitor voltage or by changing the state of connection at time intervals which are sufficient according to a draft of the circuit for charging the capacitor with a charge sufficient for the energy supply of the application-specific circuit.

For maximum energy utilization the energy storage device can be constantly connected to the supply voltage.

In accordance with a second aspect of the present invention, further a measuring device is provided which includes the circuit for detection of the angle of rotation according to the first aspect of the present invention, the measuring device being configured to detect a measured variable and to show the same on a rotational display; the circuit is configured to be operable for rotational angle detection of the rotational display and for the output of a signal corresponding to the measured variable.

In this context, the measured variable can be, for instance, a temperature, a pressure or a measured variable derived therefrom such as a density or gas density, a flow rate or filling level.

Moreover, the measured variable can be a rotation or linear movement or a variable converted into said movement.

The application-specific circuit can include a magnetic rotational angle sensor which is disposed contact-free and centrically above a pointer shaft of a pointer having a magnet.

The current from the energy storage device can also be used for operating a radio module which transmits information about the measured value wirelessly to a receiver.

Furthermore, according to a third aspect of the present invention a process for current-limited signal output for use in two-conductor technology is provided. The process comprises the steps of: filling an energy storage device up to a critical filling; detecting that the critical filling is reached in the energy storage device by a logic circuit having a digital memory; supplying the critical filling of the energy storage device to an application-specific circuit for detecting a measurement-specific movement, the critical filling corresponding to the amount of energy missing for the energy supply of the application-specific circuit; detecting a measurement-specific movement by the application-specific circuit; outputting a measuring signal corresponding to the detected measurement-specific movement; outputting the measuring signal to the logic circuit; supplying an input variable corresponding to the measuring signal to a controllable current sink; and converting the input variable into an output current on a current loop within a limited current range.

A preferred configuration of this process comprises the steps of: charging a capacitor up to a critical charge; detecting that the critical charge is reached in the capacitor by a microprocessor; discharging the critical charge of the capacitor to an application-specific circuit for detection of the rotational angle, wherein the critical charge of the supply voltage corresponds to the application-specific circuit for detection of the rotational angle; detecting an angle of rotation by the application-specific circuit; outputting a measuring signal corresponding to the detected angle of rotation; outputting the measuring signal to the microprocessor; supplying an input voltage corresponding to the measuring signal to a voltage/current converter circuit; and converting the input voltage into an output current on a current loop within a limited current range.

In particular the current which flows to the application-specific circuit for rotational angle detection can be above the restricted current range, when the capacitor is discharged.

With respect to the requirements according to NAMUR for the chemical process industry to provide a two-conductor current signal, the limited current range preferably corresponds to 4 to 20 milliamps.

Moreover, the microprocessor preferably holds the input voltage supplied to the voltage/current converter circuit, until a new measuring signal is supplied to the microprocessor by the application-specific circuit.

Furthermore, the microprocessor can detect the critical charge either by measuring the charge of the capacitor and/or the capacitor voltage or by measuring the time interval of the charging operation which is sufficient according to a draft of the circuit for charging the capacitor with a charge sufficient for the energy supply of the application-specific circuit.

In addition, the output signal can be filtered or smoothed by software and/or hardware in the form of RC or LC elements of simple or higher order.

The above-listed modifications of the preferred embodiments can be correspondingly made to the generally described solutions of the invention.

It is noted, for the rest, that the above-used term of "current sink" relates to the overall balance of the thus denoted element. Consequently, an energy output limited in time is not excluded.

BRIEF DESCRIPTION OF THE DRAWINGS

Hereinafter the invention will be described in detail by way of embodiments with reference to the enclosed drawing, in which

FIG. 2A shows a sectional side view of a tube spring measuring device along the line A-A from FIG. 2B, FIG. 2B shows a sectional front view of the tube spring measuring device, FIG. 2C shows a sectional rear view of the tube spring measuring device and FIG. D shows an enlarged detail view of the detail marked by "X" in FIG. 2C.

PREFERRED EMBODIMENTS OF THE INVENTION

The following description of the preferred embodiments of the invention by way of the enclosed drawing is intended to illustrate possible implementations of the invention and is not supposed to convey a comprehension of the invention restricted to the embodiments.

Figure 1:
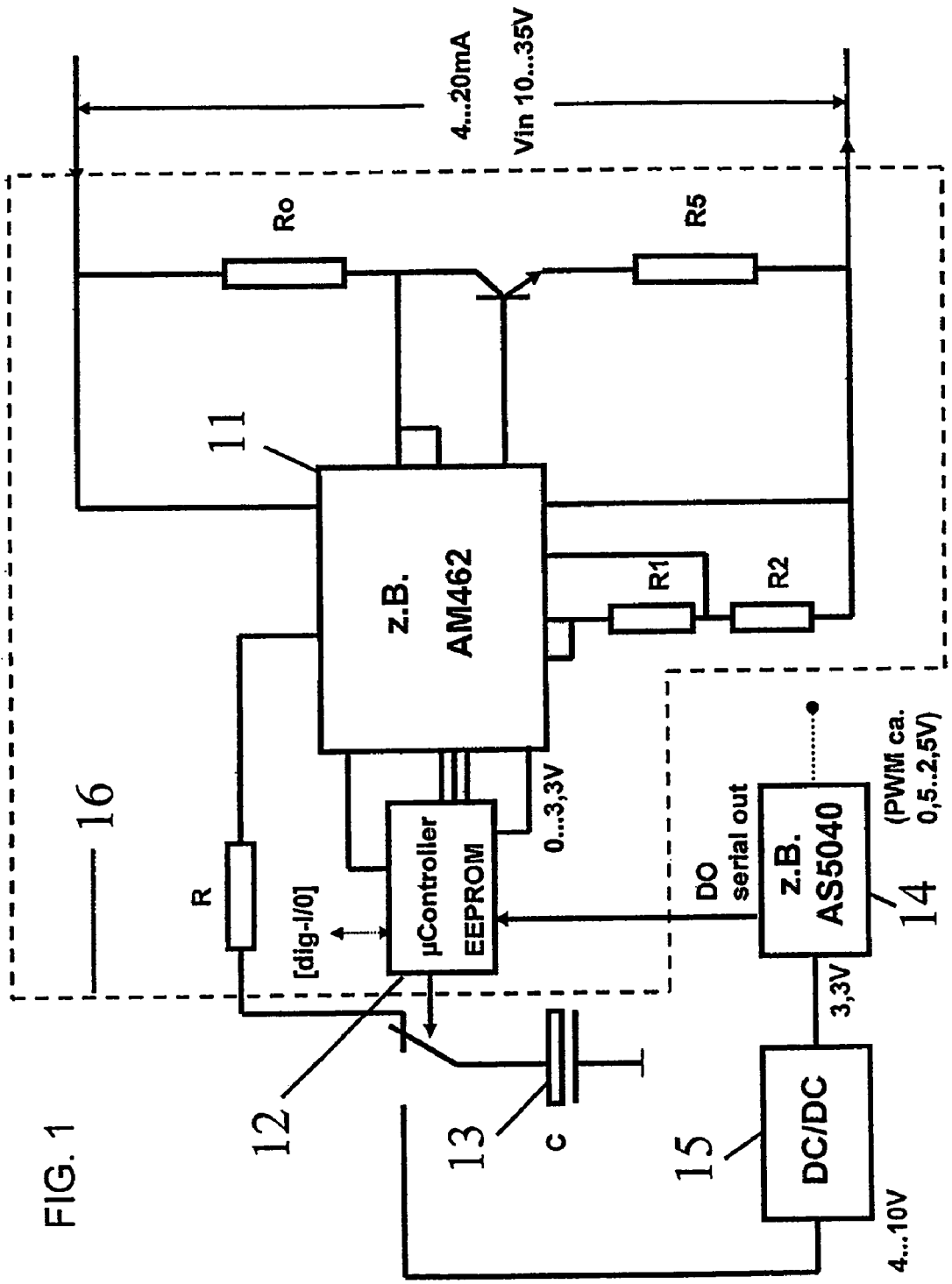
FIG. 1 shows an equivalent circuit diagram of a first embodiment of the circuit according to the invention for a measuring device.

FIG. 1 shows an equivalent circuit diagram of a first embodiment of the circuit according to the invention for a measuring device.

Reference number 11 denotes a voltage/current converter circuit which can be implemented, for instance, by the commercially available component AM462 of "analog microelectronics". Reference number 12 denotes a microprocessor which may be an EEPROM ("electrically erasable programmable read-only memory") in the form of a micro-controller ("μcontroller"). The designation "dig-I/0" indicates an individual signal adjustment in the EEPROM so that 0 to 270° are depicted on the rotational display of a measuring device at 0 to 3.3 V. Reference number 13 denotes a capacitor having the capacity C which is either connected by the microprocessor 12 via a resistor R configured for maximum capacitor current to a reference voltage terminal of the AM462 or which is connected by the microprocessor 12 via a DC-DC converter 15 to an application-specific circuit for rotational angle detection 14. The application-specific circuit 14 can be implemented, for instance, by the commercially available component AS5040 of "austriamicrosystems". This component is a magnetic rotational angle sensor operating contact-free in which an output of the absolute position value (of the angle of rotation) having a 10 bit width can be encoded into a pulse-width modulated signal. This is indicated by the designation "PWM approx. 0.5 to 2.5 V" (PWM means "pulse width modulation"). The designation "DO serial out" denotes the serial data output (DO means "data output") of the absolute position value (of the angle of rotation) having a 10 bit width. According to the first embodiment shown in FIG. 1, this output is entered into the microprocessor 12 for detection. The microprocessor 12 detects this signal and holds it at its output which is connected to an input of the voltage/current converter circuit 11, until the application-specific circuit 14 provides it with a new measuring value (a new measuring signal). Apart from the afore-mentioned input of the voltage/current converter circuit 11 (of the component AM462), the microprocessor 12 according to the first embodiment is additionally connected to the current/voltage reference terminal of the voltage/current converter circuit 11.

The circuitry of the voltage/current converter circuit 11 for operating a current loop, which is restricted to the range of from 4 to 20 milliamps required by NAMUR according to the first embodiment, is as follows. An output for system amplification and an input for a current output stage are short-circuited and connected via a resistor R1 to a negative input of the voltage/current converter circuit 11. Said negative input is connected to ground via a further resistor R2. The ground connection simultaneously constitutes the first terminal of the two-conductor system formed by the current loop. The second terminal of the two-conductor system is connected to a positive sensing resistor terminal of the current/voltage converter stage of the voltage/current converter circuit 11. Moreover, the second terminal is connected via a resistor Ro to the negative sensing resistor terminal of the current/voltage converter stage of the voltage/current converter circuit 11 and to the supply voltage terminal of the voltage/current converter circuit 11. The latter terminals are further connected to the collector of a transistor whose basis is connected to the current output of the voltage/current converter circuit 11 and whose emitter is connected via a resistor R5 to the first terminal of the two-conductor system.

By the above-described configuration according to the first embodiment of the invention the voltage/current converter circuit 11 (of AM462) controlled by the microprocessor 12 permanently operates the current loop limited to a current range of from 4 to 20 milliamps. The microprocessor has a sufficiently low internal consumption. Thus a continuous operation is possible within the range marked by the broken line 16.

In addition, an energy buffering clocked by the microprocessor 12 is realized in which the application-specific circuit 14 (of the AS5040 as rotational angle sensor) is operated for a short time only and is then switched off again, because the energy conversion thereof is comparatively high. The microprocessor 12 detects the signal output by the application-specific circuit 14 for each operation and holds it at its output to the voltage/current converter circuit 11, until a new measuring value (a new measuring signal) can be energetically produced by the application-specific circuit 14. Thus, despite the high energy conversion of the application-specific circuit 14 (of the AS5040 as rotational angle sensor) a permanent current loop operation of 4 to 20 milliamps is possible.

The above-described implementation of the invention in accordance with the first embodiment allows for an updating of the measuring values of approximately three to four measuring values per seconds. Therefore, a completely sufficient measuring value updating which allows for use in devices of maximum accuracy class is achieved, for instance, in a use as pick-off for a mechanical manometer or a mechanical thermometer. Moreover, providing the two-conductor technology in connection with mechanical measuring devices permits the use thereof in the process industry.

FIGS. 2A to 2D show a mechanical measuring device as second embodiment of the invention in which the afore-described circuit according to the first embodiment can be utilized.

Figure 2:
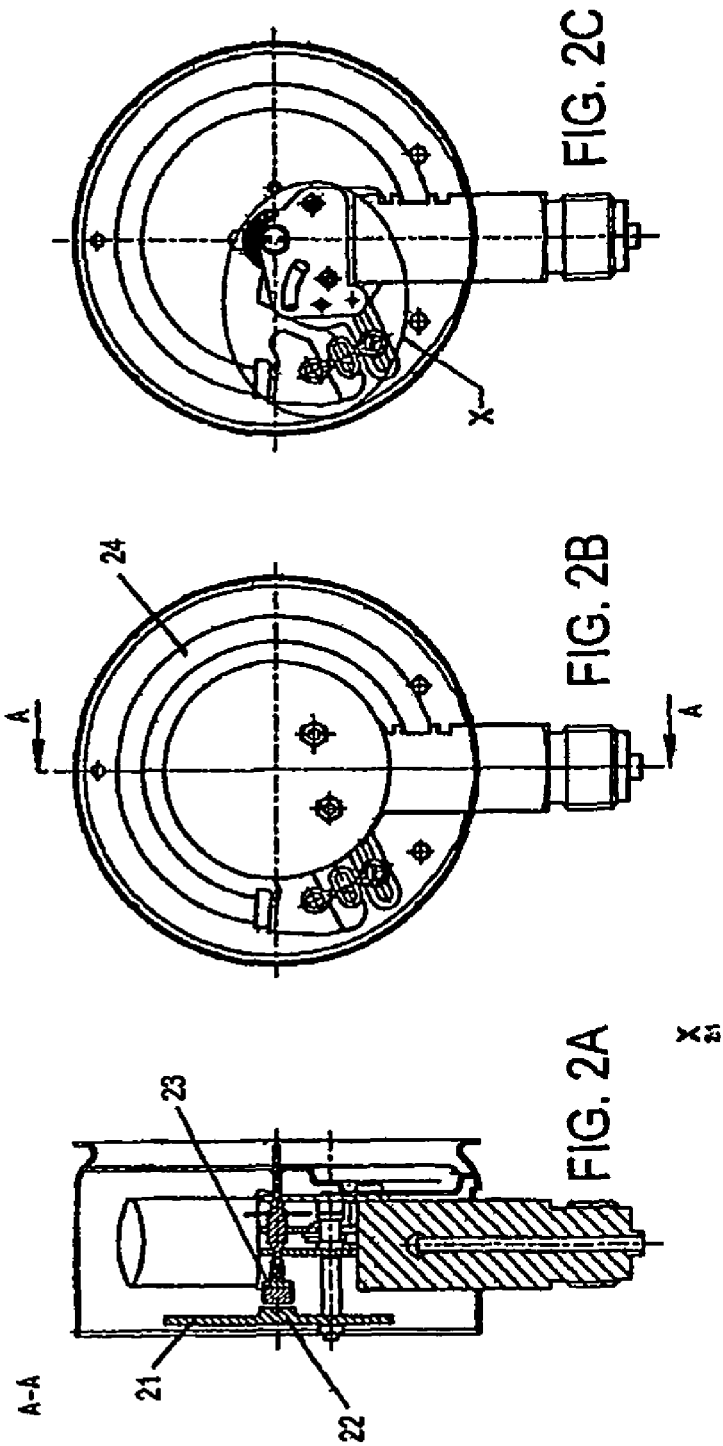
FIGS. 2A to 2D show sectional views of a measuring device in which the circuit according to the invention can be advantageously employed.

FIG. 2A shows a sectional side view along the line A-A from FIG. 2B in which a sectional rear view of the exemplary measuring device in the form of a tube spring measuring device is shown. Reference number 24 from FIG. 2B denotes the tube spring. The detail "X" from the sectional rear view shown in FIG. 2C illustrates in FIG. 2D the direct pick-off 25 at the tube spring for the pointer display on the exemplary measuring device. As shown in FIG. 2A, the pointer 23 is located on a shaft extended to the rear and supports a magnet according to the present example. The application-specific circuit 14 is disposed directly above the magnet as magnetic rotational angle sensor 22. The rotational angle sensor 22 is disposed, together with the other elements of the circuit according to the first embodiment, on a carrier board 21 which is mounted centrally above the pointer shaft in accordance with the representation in FIGS. 2A to 2D.

Thus the second embodiment provides for a measuring device of the maximum accuracy class comprising a contact-free magnetic rotational angle sensor having an absolute angle of 360° in two-conductor technology which can be employed in the process industry.

Figure 3:
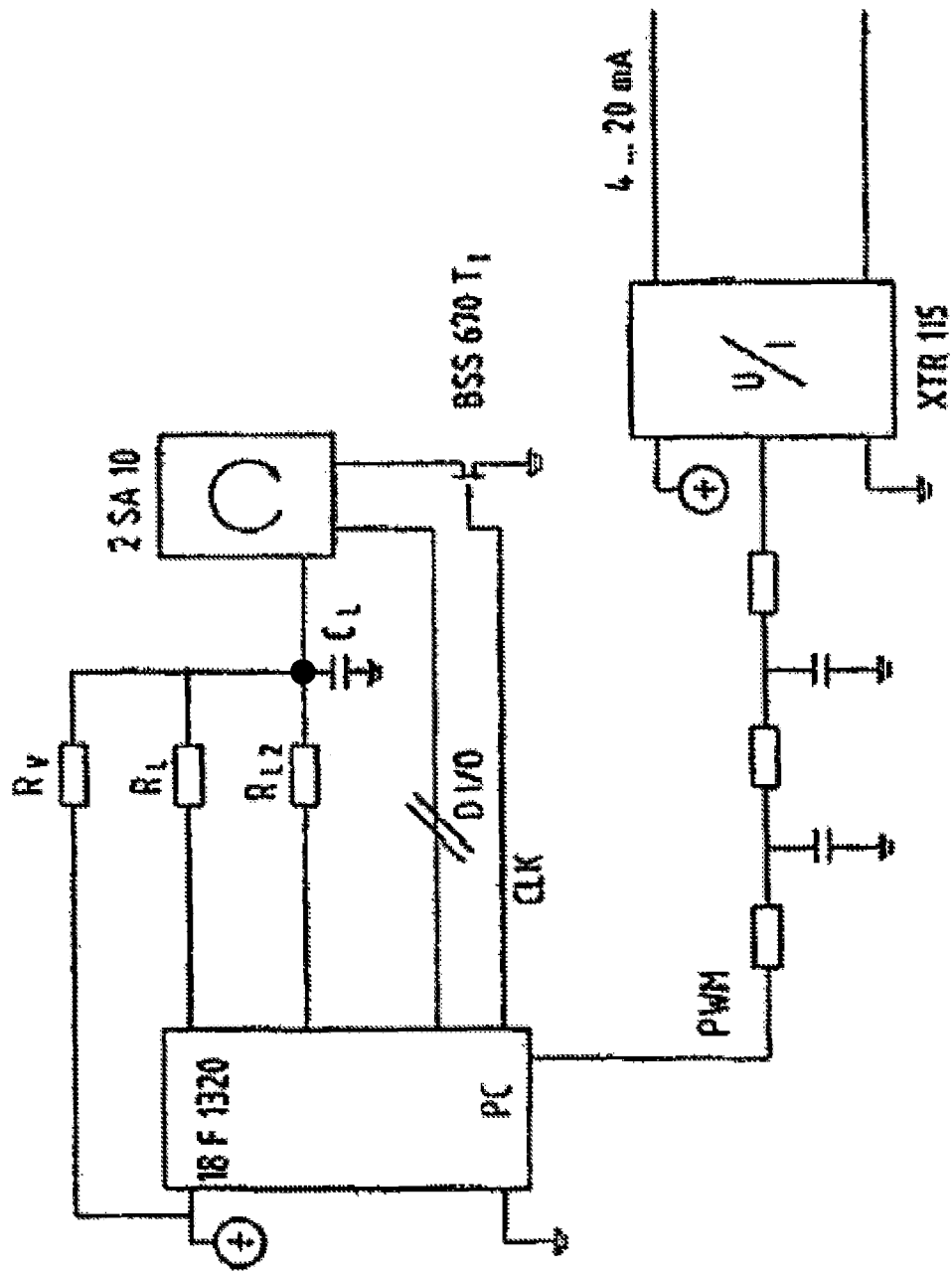
FIG. 3 shows an equivalent circuit diagram of a further embodiment of the circuit according to the invention for a measuring device.

FIG. 3 illustrates a third embodiment in which the energy storage device, the capacitor $C_L$ in this case, is charged by processor control for instance via the processor type 18F1320 of Microchip. For this purpose, the empty capacitor is initially charged via the resistor $R_L$ so as to avoid undesired current peak values in the initial moment of charging. At a later point in time the capacitor $C_L$ is continuously further charged via the resistor $R_{L2}$.

In the case of demand of a measuring value, the rotational angle sensor (e.g. type 2 SA 10 of Melexis) is supplied with current, i.e. actuated via the control line CLK and the transistor $T_1$ (e.g. type BSS670 of Infineon). Then a base supply of approx. 1 milliamp, for instance, is fed to the rotational angle sensor via the high-value resistor $R_V$ and the residual operating current still required is taken from the capacitor $C_L$.

The rotational angle sensor then transmits the measuring value via the line D I/0 to the processor PC which intermediately stores the value until a newly established measuring value is provided.

The value is then transmitted via a "PWM filter" having plural RC elements to the voltage/current converter U/I (e.g. type XTR 115 of Texas Instruments), wherein the latter then makes the measuring value in the standardized size of 4 to 20 milliamps available in the loop to a control center, for example.

According to a fourth embodiment of the invention, via the current loop a communication is implemented via the HART protocol ("Highway Addressable Remote Transducer"). The HART protocol is the leading communication technology to date in intelligent process measuring engineering and, inter alia, offers a process variable remote inquiry, a cyclic access to the process data, a parameter setting and a diagnosis. The HART protocol at the same time allows for a two-way digital communication and an analogue signaling within the current range of from 4 to 20 milliamps.

According to the foregoing description, therefore the combination of the HART protocol with the circuit according to the invention and/or the measuring device according to the invention allows for the connection of measuring devices of the maximum accuracy class to the leading communication technology of intelligent process measuring engineering. Therefore, the third embodiment is especially advantageous with respect to the use of the present invention in the process industry.

Consequently, the present description comprises a method of current-limited signal output for use in the two-conductor technology. The method comprises the steps of: charging a capacitor up to a critical charge; detecting that the critical charge is reached on the capacitor by a microprocessor; discharging the critical charge of the capacitor to an application-specific circuit for detection of the rotational angle, wherein the critical charge of the supply voltage corresponds to the application-specific circuit for detection of the rotational angle; detecting an angle of rotation by the application-specific circuit; outputting a measuring signal corresponding to the detected angle of rotation; outputting the measuring signal to the microprocessor; supplying an input voltage corresponding to the measuring signal to a voltage/current converter circuit; and converting the input voltage into an output current on a current loop within a limited current range.

While preferred embodiments of the invention are described in the foregoing by way of the enclosed drawing, a person skilled in the art is aware of the fact that numerous configurations and modifications of the invention can be made without deviating from the scope of invention defined by the following claims. Rather, such configurations and modifications have to be understood as being comprised by the invention.

The invention claimed is:

1. A circuit for a measuring instrument, comprising:
   a logic circuit having a digital memory configured for the input and output of measuring signals;
   a controllable current sink configured to operate a current loop having a limited current range, wherein the controllable current sink is configured to convert information supplied by the logic circuit into an output current on the current loop;
   an application-specific integrated circuit configured to detect a measurement-specific movement which is connected to the logic circuit for the output of measuring signals corresponding to measuring values of movement; and
   an energy storage unit connected to the controllable current sink for energy input and connected to the application-specific integrated circuit for energy output;
   wherein the logic circuit controls the state of connection of the energy storage unit so that the energy storage unit is connected to the application-specific integrated circuit each time the energy storage unit has reached an amount of energy missing in the energy supply of the application-specific integrated circuit.

2. A circuit according to claim 1, wherein the logic circuit having a digital memory is a microprocessor, the controllable current sink is a voltage/current converter circuit, the supplied information is an input voltage, the measurement-specific movement is an angle of rotation and the measuring values of movement are thus rotational angle measuring values, and the energy storage unit is a capacitor or accumulator or coil or a combination hereof and the energy input thus is a charging with a supply voltage, the energy output thus is a charge output and the missing amount of energy thus is a correspondingly sufficient charge of the capacitor or accumulator.

3. A circuit according to claim 2, wherein the circuit is arranged so that the current flowing to the application-specific circuit for detection of the rotational angle, when the capacitor is discharged, is above the limited current range.

4. A circuit according to claim 3, wherein the limited current range corresponds to 4 to 20 milliamps.

5. A circuit according to claim 2, wherein the microprocessor is configured to hold the input voltage supplied to the voltage/current converter circuit, until a new measuring signal is supplied to the microprocessor by the application-specific circuit.

6. A circuit according to claim 2, wherein the microprocessor is configured to control the state of connection of the capacitor by measuring the charge of the capacitor and/or the capacitor voltage.

7. A circuit according to claim 2, wherein the microprocessor is configured to control the state of connection of the capacitor by varying the state of connection at time intervals which are sufficient according to a design of the circuit for a charging of the capacitor with a charge sufficient for the energy supply of the application-specific circuit.

8. A circuit according to claim 2, wherein the energy storage unit is always connected to the supply voltage for maximum energy utilization.

9. A circuit according to claim 4, wherein the current loop is connected to a device configured for communication via a HART (Highway Addressable Remote Transducer) protocol.

10. A measuring device comprising:
    the circuit according to claim 1;
    wherein the measuring device is configured to detect a measured variable as well as to represent the same on a rotational display;
    the circuit is configured to be operable for detection of the rotational angle of the rotational display and for the output of a signal corresponding to the measured variable.

11. A measuring device according to claim 10, wherein the measured variable is temperature, pressure or a variable derived therefrom such as density or gas density, flow rate or filling level.

12. A measuring device according to claim 10, wherein the measured variable is a rotating movement or linear movement or a variable converted into said movement.

13. A measuring device according to claim 10, wherein the application-specific circuit has a magnetic rotational angle sensor and is arranged contact-free and centrically above a pointer shaft of a pointer having a magnet.

14. A measuring device according to claim 10, wherein the current from the energy storage unit is also used for operating a radio module which wirelessly transmits information about the measuring value to a receiver.

15. A method for current-limited signal output, comprising the steps of:
    filling an energy storage unit up to a critical fill;
    detecting that the critical fill is reached in the energy storage unit by a logic circuit having a digital memory;
    outputting the critical fill of the energy storage unit to an application-specific circuit for detecting a measurement-specific movement, the critical fill corresponding to the amount of energy missing for the energy supply of the application-specific circuit;
    detecting a measurement-specific movement by the application-specific circuit;
    outputting a measuring signal corresponding to the detected measurement-specific movement;
    outputting the measuring signal to the logic circuit;
    supplying an input variable corresponding to the measuring signal to a controllable current sink; and converting the input variable into an output current on a current loop within a limited current range.

16. A method according to claim 15, wherein the logic circuit having a digital memory is a microprocessor, the controllable current sink is a voltage/current converter circuit, the measurement-specific movement is an angle of rotation, the energy storage unit is a capacitor or accumulator and the filling thus is a charging, the critical fill is thus a critical charge, the output is thus a discharge and the missing amount of energy is thus an appropriately sufficient charge of the capacitor or accumulator for a supply voltage for the rotational angle detection, and the input variable is an input voltage.

17. A method according to claim 16, wherein the current flowing to the application-specific circuit for the detection of a rotational angle when the capacitor is discharged is above the limited current range.

18. A method according to claim 17, wherein the limited current range corresponds to 4 to 20 milliamps.

19. A method according to claim 16, wherein the microprocessor holds the input voltage supplied to the voltage/current converter circuit, until a new measuring signal is supplied to the microprocessor by the application-specific circuit.

20. A method according to claim 16, wherein the microprocessor detects the critical charge by measuring the charge of the capacitor or the capacitor voltage.

21. A method according to claim 16, wherein the microprocessor detects the critical charge by measuring the time lapse of the charging operation which is sufficient according to a design of the circuit for charging the capacitor with a charge sufficient for the energy supply of the application-specific circuit.

22. A method according to claim 18, wherein via the current loop a communication is performed through a HART (Highway Addressable Remote Transducer) protocol.

23. A method according to claim 16, wherein the measuring signal is filtered or smoothed by software and hardware in the form of RC and/or LC elements of simple or higher order.

* * * * *